Patented Nov. 6, 1928.

1,690,621

UNITED STATES PATENT OFFICE.

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK.

CELLULOSE ESTERS CONTAINING NITRO GROUPS AND HALOGEN-SUBSTITUTED ACYL GROUPS.

No Drawing.   Application filed May 14, 1927.   Serial No. 191,543.

This invention relates to mixed cellulose esters containing nitro groups and halogen substituted acyl groups, and to processes of making the same. One object of the invention is to provide esters of this character which are soluble in useful organic neutral solvents and yield transparent, flexible films. Other objects will hereinafter appear.

We have found that mixed esters of cellulose can be prepared having nitro groups and halogenated acyl groups which will be soluble in useful neutral organic solvents, such as acetone, and can be made into flexible, transparent films. We have been able to produce such compounds by reacting upon nitrocellulose with an esterifying bath containing an unsaturated acyl group until a mixed cellulose ester is produced containing nitro groups and unsaturated acyl groups. This intermediate mixed ester is then subjected to the action of a halogenating agent which introduces halogen atoms at the unsaturated bond in the acyl groups.

While we may use nitrocelluloses containing widely different amounts of nitrogen, we have obtained especially good results with one which is not quite fully nitrated,—say one having in the neighborhood of 11% of nitrogen.

For the esterifying bath we prefer to use one containing a powerful anhydrid, which does not itself contribute acyl groups to the ester. While we can use any of those set forth in our application Serial No. 179,177, filed March 28th, 1927, for process of making cellulose esters of organic acids, we prefer to use monochloroacetic anhydrid, which very powerfully impels esterification by the unsaturated acids and yet does not itself contribute groups to the ester. Said application also discloses the use of other halogen substituted fatty acid anhydrides, such as di and tri chloracetic anhydrides, the mono di and tri bromacetic anhydrides, the mono di and tri chlor and brom propionic and butyric anhydrides; and as an example of alkoxy substituted anhydrides. methoxyacetic anhydride is given. Of the unsaturated organic acids, we prefer to use those of the series beginning with acrylic, but other unsaturated acids, which are susceptible to halongenating agents, may be employed, such as cinnamic acid. Of the acrylic series, crotonic acid is found to operate very satisfactorily, although the higher members, such as undecylenic, can be employed. It is likewise desirable to have present a small amount of a mild catalyst, such as magnesium perchlorate trihydrate, for example.

We shall now give a specific example of our invention, but it will be understood that the latter is not limited to the details thus set forth, except as indicated in the appended claims.

Ten parts by weight of dry nitrocellulose containing about 11% of nitrogen are dissolved in a mixture of 50 parts by weight of chloroacetic anhydrid, 25 parts by weight of crotonic acid, and .05 parts by weight of magnesium perchlorate. The mixture is kept at 60 to 65° C. for about six hours. The cellulose nitrocrotonate thus formed is precipitated by pouring the reaction mass into methyl alcohol. This precipitate is dissolved in acetone and then reprecipitated by pouring the solution into a 50% aqueous solution of methyl alcohol. This second precipitate is preferably washed first with methyl alcohol and then with ether, finally being dried. It is soluble in acetone and in acetic acid but insoluble in chloroform, ether, or a mixture of ethyl alcohol and ethyl ether.

This intermediate product is next submitted to a halogenating agent. For example, the entire cellulose nitrocrotonate, obtained above, is dissolved in 100 parts by weight of acetic acid and 10 parts by weight of bromine are thoroughly incorporated into the solution. The mixture is allowed to stand until the desired helogenation takes place. We have found that two hours at room temperature brings about a useful bromination. Instead of bromine, chlorine gas can be bubbled thorugh the reaction mixture until the latter is saturated and then the mixture allowed to stand. The brominated product can be precipitated from the acetic acid solution with water, washed well with the latter, and then dried. It is soluble in acetone, acetic acid, and ethyl ether, but is insoluble in chloroform, or ethyl alcohol Under the conditions given in the above example, it contains about 17.8% of bromine and 6.8% of nitrogen. When its acetone solutions are coated and allowed to set into films, the latter are transparent and fairly flexible. By varying the amounts of the ingredients and the time of the first reaction, the amount of unsaturated acyl groups in the intermediate ester can be regulated, and thus upon halogenation, there will be obtained nitro esters having different percentages of halogenated acyl groups.

Having thus described our invention, what we claim as new and desire to secure by Letters Patent is:

1. A mixed inorganic and organic ester of cellulose in which there are nitro groups and a halogen-substituted acyl group.

2. A mixed cellulose ester in which there are nitro groups and a halogenated fatty acid group.

3. A mixed inorganic and organic ester of cellulose in which there are nitro groups and a brominated acyl group.

4. A mixed cellulose ester in which there are nitro groups and a brominated fatty acid group.

5. A mixed cellulose ester in which there are nitro groups and a dihalogenated fatty acid group.

6. A mixed cellulose ester in which there are nitro groups and a dibrominated fatty acid group.

7. An acetone-soluble cellulose ester containing nitro groups and a dihalogen butyryl group.

8. Cellulose dibromobutyryl nitrate.

9. The process of making mixed halogenated esters of cellulose which comprises treating nitrocellulose with an esterifying bath containing an unsaturated acyl group until a mixed cellulose ester containing nitro groups and said unsaturated acyl group is produced, and subjecting the latter to a halogenating agent until halogenation of said acyl group takes place.

10. The process of making mixed halogenated esters of cellulose which comprises treating nitrocellulose with an acylating agent containing an unsaturated acyl group corresponding to an acid of the acrylic series until a mixed cellulose ester containing nitro groups and said acyl group is produced, and subjecting the latter to a halogenating agent until halogenation of said acyl group takes place.

11. The process of making mixed halogenated esters of cellulose which comprises treating nitrocellulose with an acylating agent containing a crotonic group, until cellulose nitro-crotonate is formed, and treating the latter with a halogenating agent until halogenation takes place at the double bond in said crotonic group.

12. The process of making mixed brominated esters of cellulose which comprises treating nitrocellulose with an esterifying bath containing an unsaturated acyl group until a mixed cellulose ester containing nitro groups and said unsaturated acyl group is produced, and subjecting the latter to a brominating agent until bromination of said acyl group takes place.

13. The process of making mixed brominated esters of cellulose which comprises treating nitrocellulose with an acylating agent containing an unsaturated acyl group corresponding to an acid of the acrylic series until a mixed cellulose ester containing nitro groups and said acyl group is produced, and subjecting the latter to a brominating agent until bromination of said acyl group takes place.

14. The process of making mixed brominated esters of cellulose which comprises treating nitrocellulose with an acylating agent containing a crotonic group, until cellulose nitro-crotonate is formed, and treating the latter with a brominating agent until bromination takes place at the double bond in said crotonic group.

Signed at Rochester, New York, this 9th day of May, 1927.

HANS T. CLARKE.
CARL J. MALM.